United States Patent

Colenutt

[11] 3,973,728
[45] Aug. 10, 1976

[54] THERMAL SENSOR
[75] Inventor: Brian Frank Colenutt, Southampton, England
[73] Assignee: General Motors Corporation, Detroit, Mich.
[22] Filed: July 24, 1975
[21] Appl. No.: 598,735

Related U.S. Application Data
[63] Continuation-in-part of Ser. No. 471,272, May 20, 1974, abandoned.

[30] Foreign Application Priority Data
May 24, 1973 United Kingdom............... 24791/73

[52] U.S. Cl............................... 236/13; 123/122 D; 123/122 H
[51] Int. Cl.²......................................... G05D 23/08
[58] Field of Search.................... 123/122 D, 122 H; 236/13

[56] References Cited
UNITED STATES PATENTS

| | | | |
|---|---|---|---|
| 3,444,671 | 5/1969 | Florine............................ | 123/122 D |
| 3,513,817 | 5/1970 | Kearke............................ | 123/122 D |
| 3,714,933 | 2/1973 | Ozaki.............................. | 123/122 D |
| 3,726,512 | 4/1973 | Herwig............................ | 123/122 D |
| 3,744,715 | 7/1973 | Maddocks....................... | 123/122 H |
| 3,744,716 | 7/1973 | Charles........................... | 123/122 H |
| 3,830,210 | 8/1974 | Muller............................. | 123/122 D |

Primary Examiner—Charles J. Myhre
Assistant Examiner—R. H. Lazarus
Attorney, Agent, or Firm—C. K. Veenstra

[57] ABSTRACT

In an internal combustion engine air cleaner, a thermal sensor delivers a vacuum signal to a vacuum motor which actuates a valve unit controlling admission of ambient temperature and heated air. The sensor receives induction passage vacuum and has a bimetal strip which positions an acetal resin valve ball in an air bleed to create a vacuum signal which varies inversely with changes in the induction air temperature, the bimetal strip and valve ball being enclosed within a protective metal housing which permits prompt response to changes in induction air temperature. This construction permits the induction air flow to be maintained at a predetermined temperature.

4 Claims, 5 Drawing Figures

THERMAL SENSOR

This is a continuation-in-part of Ser. No. 471,272 filed May 20, 1974 and now abandoned.

This invention relates to thermal sensors suitable for incorporation in an internal combustion engine induction air temperature control system.

In the induction air temperature control system described and claimed in U.S. Pat. No. 3,444,847, a valve unit actuated by a vacuum motor in response to a vacuum signal controls a mixture of heated air and ambient temperature air to maintain the induction air flow at a predetermined temperature. A thermal sensor creates the vacuum signal by bleeding air into a chamber which also receives induction passage vacuum, the air bleed having a valve member positioned by a bimetal which responds to the induction air flow temperature. The present invention provides a novel thermal sensor for such an application.

A thermal sensor according to the present invention comprises a metal housing which forms the chamber, one or more fittings adapted to connect the chamber into a vacuum conduit, an air bleed opening into the chamber and surrounded by a valve seat, a non-hygroscopic plastic valve ball associated with the valve seat, and a bimetal strip secured within the chamber to position the valve ball in response to changes in induction air flow temperature.

It is found that a spherical valve member formed of non-hygroscopic plastic, such as acetal resin, experiences little wear against the valve seat even when used in applications where the sensor is subject to severe vibration. In addition, disposition of the bimetal within an enclosed metallic housing protects the bimetal while simultaneously providing the necessary response to changes in induction air flow temperature.

This sensor accordingly provides substantial advantages over earlier sensors which have the bimetal outside the housing in a relatively unprotected environment, which have the bimetal inside a plastic housing which creates a prolonged sensor response time, or which have the bimetal inside a metal housing but utilize a brass valve member which experiences excessive wear under conditions of severe vibration.

The scope of the invention is defined by the appended claims, and the details of two embodiments are hereinafter particularly described with reference to the accompanying drawings in which:

Figure 1:
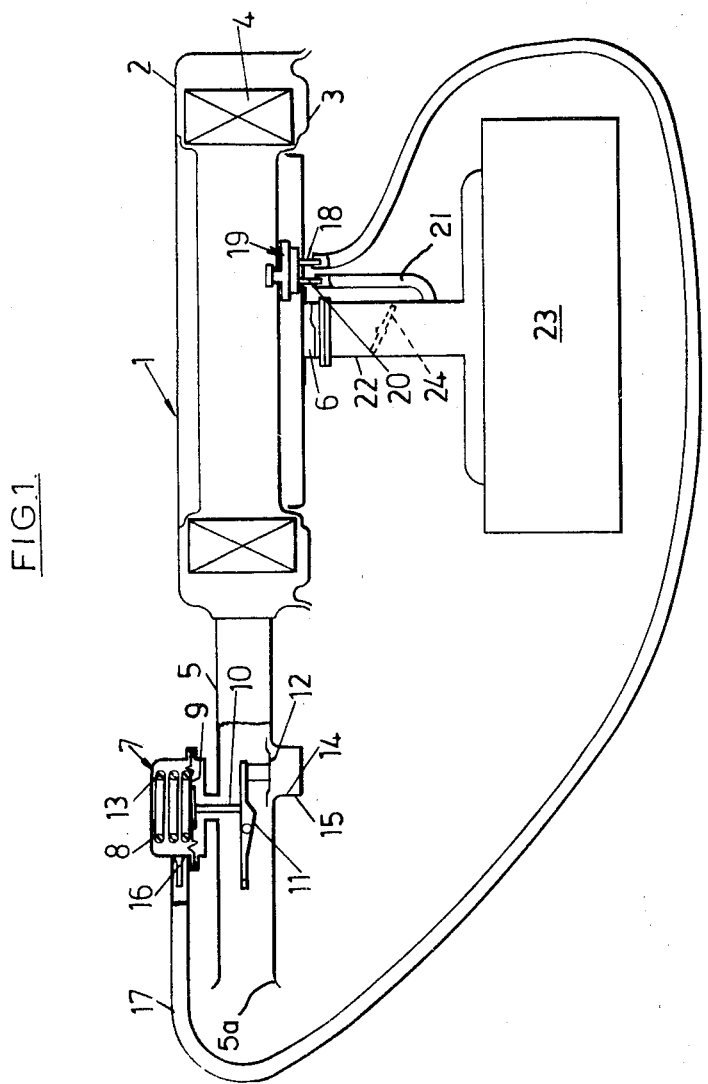
FIG. 1 is a schematic view of an internal combustion engine induction air temperature control system employing this sensor.

Referring first to FIG. 1, an air cleaner 1 has upper and lower members 2 and 3 which enclose an annular air filter element 4. A snorkel tube 5 extends from upper member 2 to admit air which then passes through filter element 4 to an outlet 6 in lower member 3. Outlet 6 discharges into the induction passage 22 of the internal combustion engine 23.

A vacuum motor 7 is mounted on snorkel tube 5 and has a cover 8 closed by a flexible diaphragm 9. A link 10 connects diaphragm 9 to a pivotally mounted valve plate 11 which controls the admission of ambient temperature air through the open end 5a of snorkel tube 5. Valve plate 11 carries a valve disc 12 which controls the admission of heated air through an opening 14 in the bottom of snorkel tube 5. Heated air is delivered to opening 14 through an auxiliary intake tube 15 which may, for example, be arranged in a position adjacent the exhaust manifold or other part of the engine that quickly warms up once the engine has started, or which may be connected by a flexible or other conduit to such a part of the engine. A spring 13 biases diaphragm 9 so that valve disc 12 obstructs heated air flow through opening 14 and valve plate 11 permits ambient air flow through the end 5a of snorkel tube 5.

Vacuum motor 7 has a fitting 16 receiving a signal conduit 17. Conduit 17 extends to a fitting 18 on a thermal sensor 19 which is mounted within air cleaner 1 on lower member 3. A second fitting 20 on sensor 19 receives a vacuum conduit 21 which extends to induction passage 22 downstream of a throttle valve 24 disposed therein.

Figure 2:
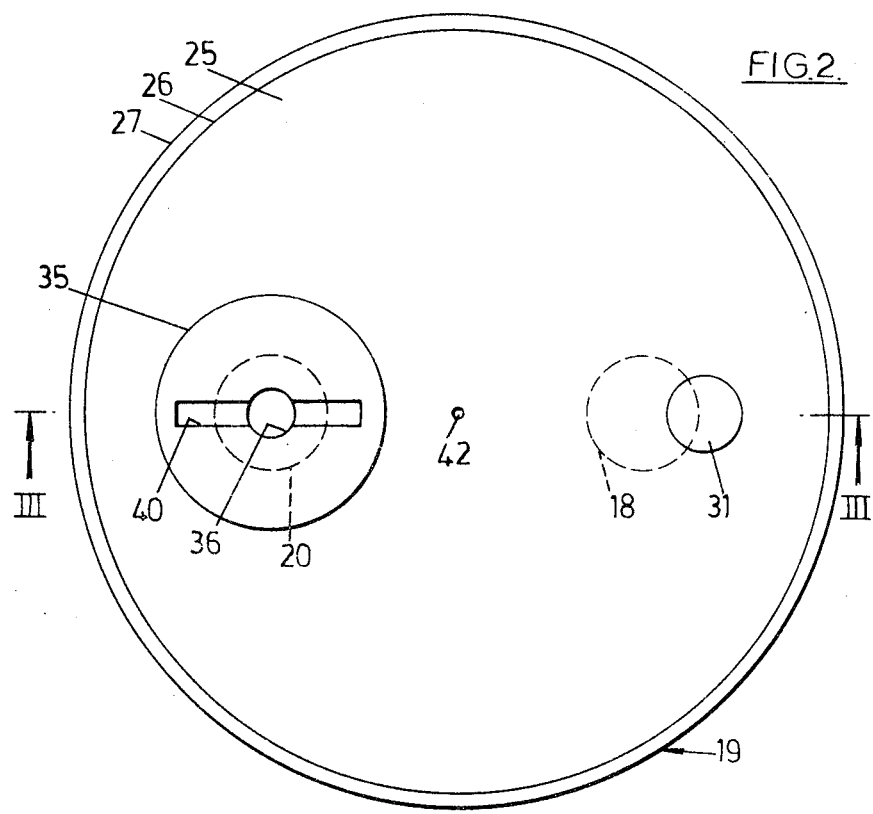
FIG. 2 is a plan view of the sensor shown in FIG. 1.
Figure 3:
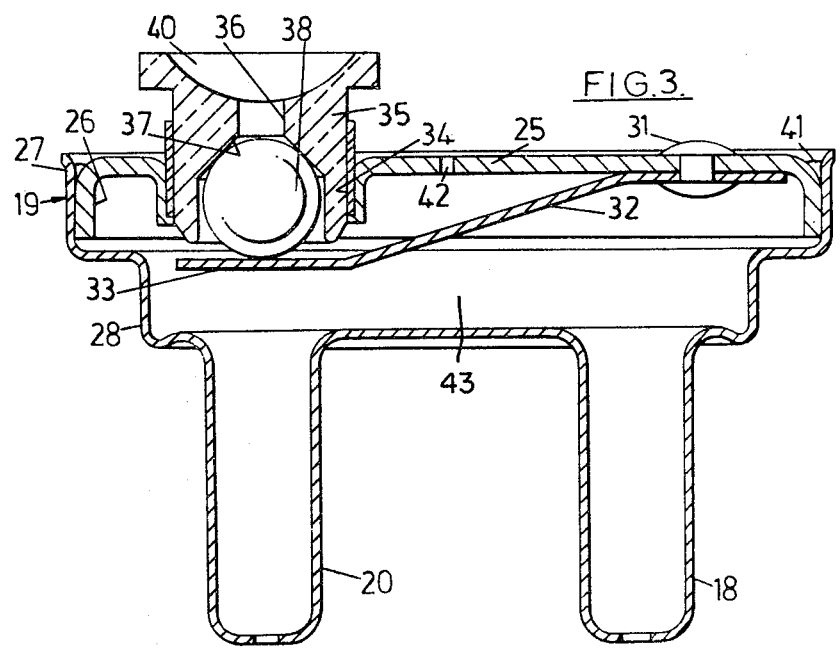
FIG. 3 is a section on the line III—III of FIG. 2 showing the details of construction of this sensor.

In the embodiment of the invention shown in FIGS. 1 to 3, sensor 19 has a housing including an upper shell 25 made as a shallow sheet metal stamping. Shell 25 has a downturned rim 26 which fits into an upturned rim 27 of a lower shell 28 also formed as a sheet metal stamping. Lower shell 28 has the two fittings 18 and 20 formed integral with the base thereof. A rivet 31 secures one end of a bimetal strip 32 to the underside of upper shell 25, and bimetal strip 32 is angled so that its free end 33 is spaced from and substantially parallel to upper shell member 25. Above the free end 33 of bimetal strip 32, upper shell 25 has a threaded aperture 34 which receives a valve seat member formed as a brass plug 35. Plug 35 has a longitudinal air bleed bore 36 which is widened at the lower end thereof to form a tapered annular valve seat 37. A spherical valve ball 38 is located within the widened end of bore 36 and is adapted to be pressed into engagement with valve seat 37 by the free end 33 of bimetal strip 32.

Plug 35 has a slot 40 formed in the top face thereof to permit rotation of the plug by a screwdriver for the purpose of calibrating the sensor. When plug 35 is moved downwardly, bimetal strip 32 must be heated to a higher temperature before it will permit valve ball 38 to move away from valve seat 37.

The joint between upper and lower shells 25 and 28 is preferably sealed with an adhesive sealant 41.

In the operation of sensor 19, the vacuum downstream of throttle 24 is applied through vacuum conduit 21, fitting 20, the chamber 43 formed between shells 25 and 28, fitting 18, signal conduit 17, and fitting 16 to vacuum motor 7. Bimetal strip 32 is arranged so that when the induction air flow through air cleaner 1 is below a predetermined temperature, valve ball 38 is held against valve seat 37. The vacuum thus applied to vaccum motor 7 causes valve plate 11 to obstruct the open end 5a of snorkel tube 5 and to move valve disc 12 away from opening 14. Heated air is thus drawn into air cleaner 1 through auxiliary intake tube 15. Above a predetermined temperature, bimetal strip 32 deflects substantially from the position shown in FIG. 3 and valve ball 38 unseats to fully open bore 36 so that air can freely bleed into chamber 43, thus substantially reducing the vacuum signal delivered to vacuum motor 7. Spring 13 thereupon moves valve plate 11 and valve disc 12 to the position shown in FIG. 1, obstructing heated air flow through opening 14 and permitting ambient temperature air flow through the open end 5a of snorkel tube 5.

It will be appreciated, of course, that at the predetermined temperature bimetal strip 32 positions valve ball 38 to partially open bore 36, and the resulting partial air bleed into chamber 43 creates an intermediate vacuum signal. In response, diaphragm 9 positions valve plate 11 and valve disc 12 to provide a mixture of ambient and heated air, thus maintaining the induction air flow at the predetermined temperature.

It also will be appreciated that during wide open throttle or heavy load operation the vacuum downstream of throttle 24 will decrease substantially. Unless other controls are provided, diaphragm 9 then positions valve plate 11 and valve disc 12 as shown in FIG. 1 and the coolest air possible is supplied for maximum power.

Upper shell 25 has a small bleed hole 42 to allow a small flow of induction air into chamber 43, thus increasing the speed of response of bimetal strip 32 to changes in the temperature of the induction air flow. A hole of 0.6 mm has been found satisfactory for this purpose.

Figure 4:
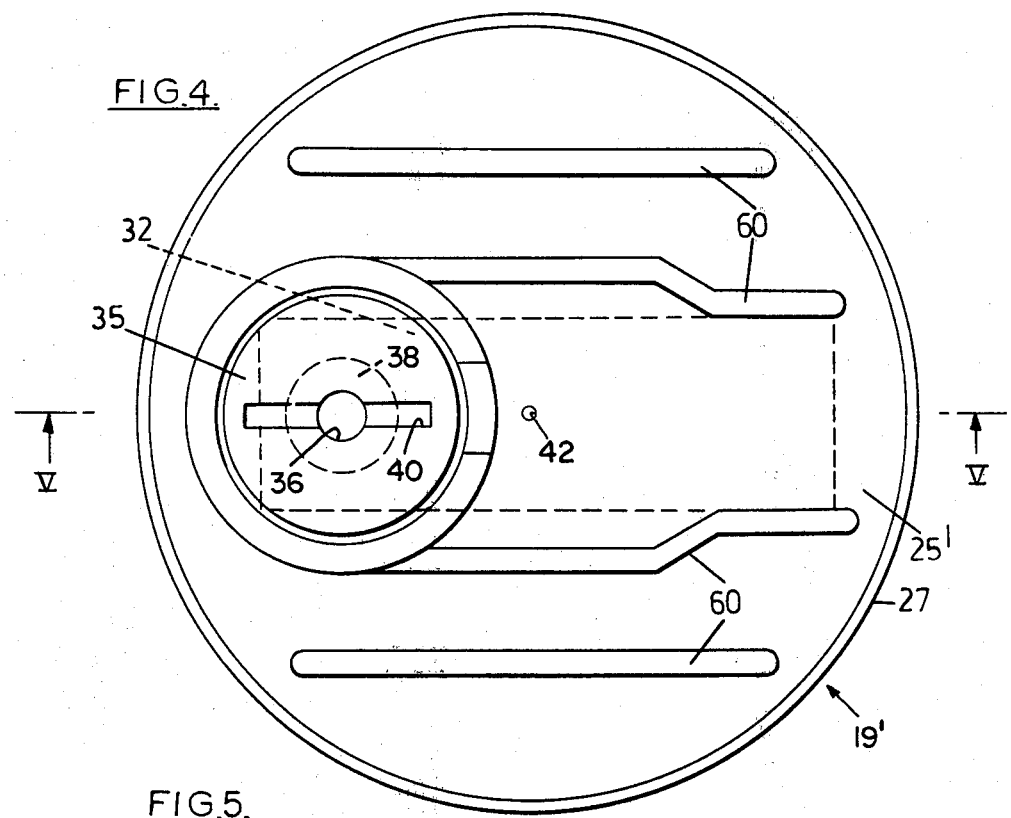
FIGS. 4 and 5 are views, similar to FIGS. 2 and 3, of a second embodiment of this sensor.
Figure 5:
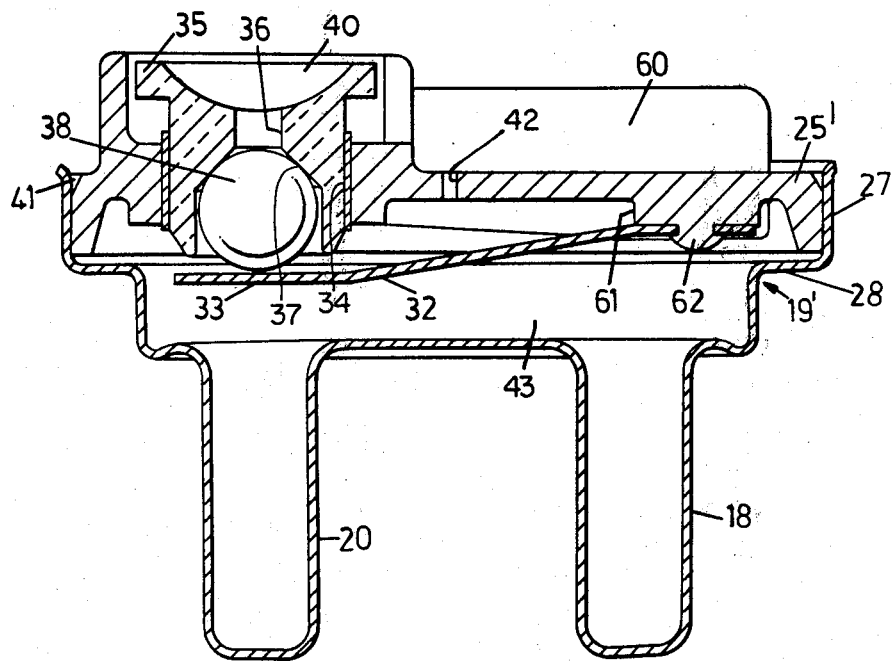

The sensor 19' shown in FIGS. 4 and 5 is similar to that shown in FIGS. 2 and 3, but in this embodiment the upper shell 25' is made as a metal die casting and incorporates integral fins 60 to give increased heat transfer surface and thus reduce the time required for bimetal strip 32 to respond to changes in the induction air flow temperature. Further, shell 25' is formed with an integral pad 61 on which bimetal strip 32 is mounted, the pad having a peg 62 which extends through an opening in the end of bimetal strip 32 and which is then riveted over to secure strip 32 to pad 61.

In some applications, bleed hole 42 may be provided in upper shell 25' opposite bimetal strip 32 so that air may enter chamber 43 through the opening and impinge on strip 32 to further enhance response of strip 32 to the temperature of the induction air flow.

In the embodiments described the relative positions and dimensions of plug 35, valve seat 37, valve ball 38, bimetal strip 32 and shells 25 and 28 are such that, when strip 32 deflects in response to high temperature and abuts the base of shell 28, ball 38 is still retained within the lower end of bore 36 in plug 35.

In both sensors 19 and 19', valve ball 38 is formed of a non-hygroscopic plastic such as one of the acetal resins known as "Hostaform C" available from Hoechst Farbwerke AG, "Delrin" available from E. I. du Pont de Nemours & Company, or "Celcon" available from Celanese Corporation. Other plastics with similar impact strength, deflection temperature, water absorption and organic solvent resistance include glass reinforced polypropylene and glass fiber filled epoxy resin. An acetal resin or other non-hygroscopic plastic ball does not exhibit the wear experienced by the brass valve members used in similar sensors when subjected to the severe vibration created on certain small engines, and an acetal resin or other non-hygroscopic plastic ball does not exhibit the physical changes experienced by the nylon balls used in similar sensors when subjected to extremely low temperatures. The durability of sensors 19 and 19' is thus substantially enhanced over the earlier sensors.

In addition, sensors 19 and 19' respond to changes in induction air temperature in substantially less time than similar sensors having plastic housings. This important characteristic of sensors 19 and 19' is attributed primarily to the heat transfer characteristics of upper shells 25 and 25' and to the carefully sized bleed hole 42.

The embodiments of the invention in which an exclusive property or privilege is claimed are defined as follows:

1. A thermal sensor adapted for use in an internal combustion engine induction system having an inlet for air at ambient temperature and an inlet for heated air, valve means controlling air flow through said inlets, a vacuum motor positioning said valve means to allow heated air flow in direct relation and ambient temperature air in inverse relation with a vacuum signal and having a fitting for receiving the vacuum signal, and a source of vacuum, said thermal sensor comprising first and second shells defining a chamber therebetween, at least one of said shells being adapted for exposure to the air flow in said induction system downstream of said inlets and being formed of metal to provide rapid heat transfer to and from said chamber, fitting means adapted to connect said chamber to said vacuum source to create a subatmospheric pressure in said chamber, one of said shells having an air bleed opening into said chamber for admitting air to increase the pressure therein and further having a valve seat surrounding said air bleed within said chamber, a spherical valve ball formed of non-hygroscopic plastic associated with said valve seat for varying air flow through said air bleed to create a controlled vacuum signal within said chamber, and a bimetal strip disposed within said chamber and biasing said ball toward said valve seat with a force that varies inversely with the temperature created by heat transfer through said metal shell to cause said ball to admit air through said air bleed to create a vacuum signal which varies inversely with such temperature, said fitting means being further adapted to connect said chamber to said vacuum motor fitting to deliver said vacuum signal to said vacuum motor whereby said vacuum motor may position said valve means to allow increased heated air flow and decreased ambient temperature air flow when the induction air flow downstream of said inlets is below a predetermined temperature and to allow decreased heated air flow and increased ambient temperature air flow when the induction air flow downstream of said inlets is above the predetermined temperature.

2. A thermal sensor adapted for use in an internal combustion engine induction system having an inlet for air at ambient temperature and an inlet for heated air, valve means controlling air flow through said inlets, a vacuum motor positioning said valve means to allow heated air flow in direct relation and ambient temperature air in inverse relation with a vacuum signal and having a fitting for receiving the vacuum signal, and a source of vacuum, said thermal sensor comprising first and second shells defining a chamber therebetween, at least one of said shells being adapted for exposure to the air flow in said induction system downstream of said inlets and being formed of metal to provide rapid heat transfer to and from said chamber, fitting means adapted to connect said chamber to said vacuum source to create a subatmospheric pressure in said chamber, one of said shells having an air bleed opening into said chamber for admitting air to increase the pressure therein and further having a valve seat surrounding said air bleed within said chamber, a spherical valve ball formed of acetal resin associated with said valve seat for varying air flow through said air bleed to create a controlled vacuum signal within said chamber, and a bimetal strip disposed within said chamber and biasing said ball toward said valve seat with a force that varies inversely with the temperature created by heat transfer through said metal shell to cause said ball to admit air through said air bleed to create a vacuum signal which varies inversely with such temperature, said fitting means being further adapted to connect said chamber to said vacuum motor fitting to deliver said vacuum signal to said vacuum motor whereby said vacuum motor may position said valve means to allow increased heated air flow and decreased ambient temperature air flow when the induction air flow downstream of said inlets is below a predetermined temperature and to allow decreased heated air flow and increased ambient temperature air flow when the induction air flow downstream of said inlets is above the predetermined temperature.

3. A thermal sensor adapted for use in an internal combustion engine induction system having an inlet for air at ambient temperature and an inlet for heated air, valve means controlling air flow through said inlets, a vacuum motor positioning said valve means to allow heated air flow in direct relation and ambient temperature air in inverse relation with a vacuum signal and having a fitting for receiving the vacuum signal, and a source of vacuum, said thermal sensor comprising first and second shells defining a chamber therebetween, at least one of said shells being adapted for exposure to the air flow in said induction system downstream of said inlets and being formed as a metal die casting having a plurality of fins extending therefrom to provide rapid heat transfer to and from said chamber, fitting means adapted to connect said chamber to said source to create a subatmospheric pressure in said chamber, one of said shells having an air bleed opening into said chamber for admitting air to increase the pressure therein and further having a valve seat surrounding said air bleed within said chamber, a spherical valve ball formed of non-hygroscopic plastic associated with said valve seat for varying air flow through said air bleed to create a controlled vacuum signal within said chamber, and a bimetal strip disposed within said chamber and biasing said ball toward said valve seat with a force that varies inversely with the temperature created by heat transfer through said metal shell to cause said ball to admit air through said air bleed to create a vacuum signal which varies inversely with such temperature, said fitting means being further adapted to connect said chamber to said vacuum motor fitting to deliver said vacuum signal to said vacuum motor whereby said vacuum motor may position said valve means to allow increased heated air flow and decreased ambient temperature air flow when the induction air flow downstream of said inlets is below a predetermined temperature and to allow decreased heated air flow and increased ambient temperature air flow when the induction air flow downstream of said inlets is above the predetermined temperature.

4. A thermal sensor adapted for use in an internal combustion engine induction system having an inlet for air at ambient temperature and an inlet for heated air, valve means controlling air flow through said inlets, a vacuum motor positioning said valve means to allow heated air flow in direct relation and ambient temperature air in inverse relation with a vacuum signal and having a fitting for receiving the vacuum signal, and a source of vacuum, said thermal sensor comprising a lower shell having an upturned rim, an upper shell having a downturned rim received within said lower shell rim, said shells defining a chamber therebetween, at least one of said shells being adapted for exposure to the air flow in said induction system downstream of said inlets, said shells being formed as sheet metal stampings to provide rapid heat transfer to and from said chamber, said lower shell having a first fitting adapted to connect said chamber to said vacuum source to create a subatmospheric pressure in said chamber, said upper shell having a threaded aperture, a plug adjustably received in said aperture and having an air bleed opening into said chamber for admitting air to increase the pressure therein and further having a tapered annular valve seat surrounding said air bleed within said chamber, a spherical valve ball formed of acetal resin associated with said valve seat for varying air flow through said air bleed to create a controlled vacuum signal within said chamber, and a bimetal strip having one end riveted to the underside of said upper shell within said chamber and having its free end disposed biasing said ball toward said valve seat with a force that varies inversely with the temperature created by heat transfer through said metal shells to cause said ball to admit air through said air bleed to create a vacuum signal which varies inversely with such temperature, said lower shell having a second fitting adapted to connect said chamber to said vacuum motor fitting to deliver said vacuum signal to said vacuum motor whereby said vacuum motor may position said valve means to allow increased heated air flow and decreased ambient temperature air flow when the induction air flow downstream of said inlets is below a predetermined temperature and to allow decreased heated air flow and increased ambient temperature air flow when the induction air flow downstream of said inlets is above the predetermined temperature.

\* \* \* \* \*